United States Patent
Sasao (10) Patent No.: US 10,930,162 B2
(45) Date of Patent: Feb. 23, 2021

(54) UNMANNED AERIAL VEHICLE, DELIVERY SYSTEM, CONTROL METHOD FOR UNMANNED AERIAL VEHICLE, AND PROGRAM FOR CONTROLLING UNMANNED AERIAL VEHICLE

(71) Applicant: SZ DJI TECHNOLOGY CO., LTD., Shenzhen (CN)

(72) Inventor: Yukiyoshi Sasao, Tokyo (JP)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 110 days.

(21) Appl. No.: 16/202,630

(22) Filed: Nov. 28, 2018

(65) Prior Publication Data

US 2019/0147751 A1 May 16, 2019

Related U.S. Application Data

(63) Continuation of application No. PCT/JP2016/067587, filed on Jun. 13, 2016.

(51) Int. Cl.
*G05D 1/00* (2006.01)
*G08G 5/00* (2006.01)
(Continued)

(52) U.S. Cl.
CPC ......... *G08G 5/0069* (2013.01); *B64C 39/024* (2013.01); *G01C 21/005* (2013.01);
(Continued)

(58) Field of Classification Search
CPC .. G08G 5/0069; G08G 5/0091; G08G 5/0039; G08G 5/045; G08G 5/0021;
(Continued)

(56) References Cited

U.S. PATENT DOCUMENTS

2010/0121574 A1* 5/2010 Ariyur ................. G08G 5/0021
    701/301
2012/0158280 A1* 6/2012 Ravenscroft ........... G05D 1/106
    701/400
(Continued)

FOREIGN PATENT DOCUMENTS

CN    104503462 A    4/2015
CN    104932526 A    9/2015
(Continued)

OTHER PUBLICATIONS

The World Intellectual Property Organization (WIPO) International Search Report and Written Opinion for PCT/JP2016/067587 Sep. 13, 2016 3 pages.

(Continued)

*Primary Examiner* — Shardul D Patel
(74) *Attorney, Agent, or Firm* — Anova Law Group, PLLC (57) ABSTRACT

An unmanned aerial vehicle includes a storage storing information regarding a plurality of regions and a control circuitry. The control circuitry is configured to select a first one of the plurality of regions that has a highest priority among the plurality of regions as a destination, and change the destination to a second one of the plurality regions that has a next highest priority among the plurality of regions in response to determining that a selected path to the destination is not suitable for flight.

20 Claims, 6 Drawing Sheets

(51) Int. Cl.

| | | |
|---|---|---|
| *B64C 39/02* | (2006.01) | |
| *G05D 1/10* | (2006.01) | |
| *G08G 5/04* | (2006.01) | |
| *G01C 21/00* | (2006.01) | |
| *G06K 9/00* | (2006.01) | |
| *G01C 21/34* | (2006.01) | |

(52) U.S. Cl.
CPC ............ *G05D 1/0088* (2013.01); *G05D 1/10* (2013.01); *G06K 9/00805* (2013.01); *G08G 5/0021* (2013.01); *G08G 5/0039* (2013.01); *G08G 5/0091* (2013.01); *G08G 5/045* (2013.01); *B64C 2201/127* (2013.01); *B64C 2201/128* (2013.01); *G01C 21/3461* (2013.01)

(58) Field of Classification Search
CPC .......... G05D 1/10; G05D 1/0088; G05D 1/00; G01C 21/005; G01C 21/3461; G06K 9/00805; B64C 39/024; B64C 2201/128; B64C 2201/127; B64C 2201/141
USPC .................................................. 701/2, 3, 400
See application file for complete search history.

(56) References Cited

U.S. PATENT DOCUMENTS

| | | | | |
|---|---|---|---|---|
| 2014/0156109 | A1* | 6/2014 | Estkowski | G05D 1/101 |
| | | | | 701/2 |
| 2014/0277834 | A1* | 9/2014 | Levien | B64C 39/024 |
| | | | | 701/2 |
| 2015/0120094 | A1* | 4/2015 | Kimchi | G05D 1/00 |
| | | | | 701/3 |
| 2015/0336667 | A1* | 11/2015 | Srivastava | G06Q 10/00 |
| | | | | 701/2 |
| 2015/0379874 | A1* | 12/2015 | Ubhi | G05D 1/101 |
| | | | | 701/3 |
| 2016/0140851 | A1* | 5/2016 | Levy | G08G 5/0039 |
| | | | | 701/3 |
| 2016/0189101 | A1* | 6/2016 | Kantor | G08G 5/0026 |
| | | | | 705/338 |
| 2016/0225264 | A1* | 8/2016 | Taveira | G08G 5/0013 |
| 2016/0284221 | A1* | 9/2016 | Hinkle | B64C 39/024 |
| 2017/0267347 | A1* | 9/2017 | Rinaldi | B64D 17/80 |

FOREIGN PATENT DOCUMENTS

| | | |
|---|---|---|
| CN | 105204520 A | 12/2015 |
| CN | 105334865 A | 2/2016 |
| JP | H07029099 A | 1/1995 |
| JP | 2004004021 A | 1/2004 |
| JP | 2006107475 A | 4/2006 |
| JP | 2006168914 A | 6/2006 |
| JP | 2009541177 A | 11/2009 |
| JP | 201095246 A | 4/2010 |
| JP | 2010214979 A | 9/2010 |
| JP | 2011150512 A | 8/2011 |
| JP | 2015057690 A | 3/2015 |
| JP | 2015143966 A | 8/2015 |
| JP | 201618413 A | 2/2016 |
| JP | 2017534101 A | 11/2017 |
| WO | 2015141445 A1 | 9/2015 |
| WO | 2016039882 A1 | 3/2016 |

OTHER PUBLICATIONS

Amazon Prime Air, Accessed May 17, 2017 http://www.amazon.com/b?node=8037720011.

* cited by examiner

| | Wind Speed | Obstacle Detection | Remaining Amount of Battery | Risk Level Score |
|---|---|---|---|---|
| Case 1 | 0 | 55 | 0 | 55 |
| Case 2 | 33 | 0 | 15 | 48 |

FIG. 6

UNMANNED AERIAL VEHICLE, DELIVERY SYSTEM, CONTROL METHOD FOR UNMANNED AERIAL VEHICLE, AND PROGRAM FOR CONTROLLING UNMANNED AERIAL VEHICLE

CROSS-REFERENCE TO RELATED APPLICATION

This application is a continuation of International Application No. PCT/JP2016/067587, filed on Jun. 13, 2016, the entire contents of which are incorporated herein by reference.

FIELD

The disclosed embodiments relate to an unmanned aerial vehicle, and more specifically to an unmanned aerial vehicle used in a system for delivering a package to a recipient.

BACKGROUND

In recent years, technologies have been proposed for deliveries using an unmanned aerial vehicle (UAV). Specifically, these technologies mount a package on a UAV at a take-off point, and automatically fly the UAV to a delivery destination. The UAV releases the package when reaching the destination, and the recipient then receives the package released by the UAV.

Generally, UAVs recognize a destination using a satellite positioning system called a Global Navigation Satellite System (GNSS) and recognize a path to the destination. In "Amazon Prime Air", [online], [accessed May 17, 2016], Internet <URL: http://www.amazon.com/b?node=8037720011>, a technology is disclosed wherein a marker is set on the destination to clarify the destination (landing point), and this marker is detected using a camera mounted on the UAV.

In Japanese Unexamined Patent Application Publication No. 2010-95246, a technology is disclosed wherein a UAV changes its flight path to avoid obstacles when visually detected until it reaches the destination and to avoid unknown aircraft when acoustically detected until it reaches the destination.

SUMMARY

The conventional art places emphasis on how to get the UAV to reach its desired destination and does not consider cases in which it is realistically difficult for a UAV to reach its destination.

One embodiment of the present disclosure can be an unmanned aerial vehicle. The unmanned aerial vehicle can include a storage, a selecting unit, and a changing unit. The storage can store a plurality of regions. The selecting unit can select a region having the highest priority as the destination from among the plurality of regions. The changing unit can change the destination selected by the selecting unit to a region having the next highest priority when it is determined that a selected path to the destination is not suitable for flight.

A destination can be changed to a region having the next highest priority when it is determined that a selected path to the destination is not suitable for flight. An unmanned aerial vehicle can fly toward another destination when it is realistically difficult for the unmanned aerial vehicle to reach the destination.

In one embodiment of the present disclosure, a priority can be given to each of the plurality of regions.

In one embodiment of the present disclosure, a receiving unit for receiving a change instruction for changing the priority of a region can be further included. The priority of the region stored in the storage can be changed following the change instruction.

The priority of a region can be changed. User convenience can be improved.

In one embodiment of the present disclosure, the changing unit can change the destination selected in the selecting unit to a region having the highest priority. The region having the highest priority can be from among regions having their priority changed following the change instruction and regions not having their priority changed.

The changing unit can change a region having the highest priority to the destination. The region having the highest priority can be from among regions having their priority changed following the change instruction and regions not having their priority changed. Therefore, when a change instruction is received for changing to a region having a higher priority than the current destination, the destination can be changed to the region having high priority received in the change instruction.

In one embodiment of the present disclosure, the changing unit can change the destination to a region having the highest priority from among regions having their priority changed following the change instruction and regions that have not been selected as a destination.

In one embodiment of the present disclosure, the destination can be changed to a region having a high priority from among the regions, not including the destination already selected as a region.

In one embodiment of the present disclosure, the changing unit can carry out the change using regions including the regions having their priority changed when it is determined that the selected path to the destination is not suitable for flight of the unmanned aerial vehicle.

The changing unit can control to not change the destination while it is determined that the path is suitable for flight even if it has received a change instruction by the receiving unit.

In one embodiment of the present disclosure, the changing unit can carry out the change regardless of the determination when the change instruction is received by the receiving unit.

The changing unit can quickly change the destination even if it is not determined that a path is not suitable for flight when a change instruction is received by the receiving unit.

In one embodiment of the present disclosure, a determining unit can further include determining whether the selected path to the destination is suitable for flight of the unmanned aerial vehicle.

In one embodiment of the present disclosure, the determining unit can evaluate the selected path to the destination and can carry out determination based on the evaluation results.

In one embodiment of the present disclosure, the evaluation can be carried out based on a plurality of evaluation items that can affect the path.

In one embodiment of the present disclosure, the determining unit can determine that the path is not suitable for flight when it is evaluated that the unmanned aerial vehicle is in a preset state in at least one evaluation item from among the plurality of evaluation items.

It can be determined that a path is not suitable for flight when it is evaluated that the unmanned aerial vehicle is in a preset state in at least one evaluation item from among the plurality of evaluation items. It can operate while focusing on safety.

In one embodiment of the present disclosure, the determining unit can determine that the path is not suitable for flight of the unmanned aerial vehicle when at least one value of an evaluation item from among quantified values of the plurality of evaluation items exceeds a predetermined threshold value.

In one embodiment of the present disclosure, the determining unit can determine that the path is not suitable for flight of the unmanned aerial vehicle when a value totaling each quantified value of the plurality of evaluation items exceeds a predetermined threshold value.

The determining unit can determine that the path is not suitable for flight of the unmanned aerial vehicle when a value totaling each quantified value of the plurality of evaluation items exceeds a predetermined threshold value. Evaluation can be carried out considering multiple factors.

In one embodiment of the present disclosure, the plurality of evaluation items can include items relating to each other.

In one embodiment of the present disclosure, at least one of the plurality of evaluation items can be a value not related to other evaluation items.

In one embodiment of the present disclosure, at least one of the plurality of evaluation items can be wind speed.

In one embodiment of the present disclosure, wind speed can be used as one of the evaluation items. The destination can be changed to another region when the path has strong winds.

In one embodiment of the present disclosure, the unmanned aerial vehicle can have an anemometer, and the wind speed can be measured using the anemometer.

In one embodiment of the present disclosure, the unmanned aerial vehicle can have an inertial measurement unit, and the wind speed can be calculated based on the difference between a position of the unmanned aerial vehicle measured using the inertial measurement unit and a predicted position.

In one embodiment of the present disclosure, the wind speed can be acquired from an external device of the unmanned aerial vehicle.

In one embodiment of the present disclosure, at least one of the plurality of evaluation items can be a value indicating the extent to which an obstacle in the path affects the path.

In one embodiment of the present disclosure, a value indicating the extent to which an obstacle in the path affects the path can be used as one of the evaluation items. The destination can be changed to another region when an obstacle is detected in the path.

In one embodiment of the present disclosure, when the obstacle is detected, the value can be higher than the value before the obstacle was detected.

In one embodiment of the present disclosure, when the detection of the obstacle is continued for a fixed period of time, the value can be higher than the value before the obstacle was detected.

In one embodiment of the present disclosure, the unmanned aerial vehicle can have an ultrasonic sensor. The detection of the obstacle can be carried out using the ultrasonic sensor.

In one embodiment of the present disclosure, the unmanned aerial vehicle can have a transmitter and a receiver of a laser. The detection of the obstacle can be carried out using the laser.

In one embodiment of the present disclosure, the unmanned aerial vehicle can have a plurality of imaging devices. The detection of the obstacle can be carried out using images having parallax, captured using the plurality of imaging devices.

In one embodiment of the present disclosure, at least one of the plurality of evaluation items can be a value indicating a remaining battery amount.

In one embodiment of the present disclosure, a remaining battery amount can be used as one of the evaluation items. The destination can be changed to another region when the battery is insufficient to fly the path.

In one embodiment of the present disclosure, the destination can be a delivery location of a package. The region can be a region of the delivery location of the package.

In one embodiment of the present disclosure, the storage can store the plurality of regions based on information sent from an external device.

In one embodiment of the present disclosure, the storage can be detachable from the unmanned aerial vehicle.

In one embodiment of the present disclosure, the changing unit can change the destination to a region other than the selected region when there is no region with the next highest priority.

The destination can be changed to a region other than the selected region when there is no region with the next highest priority. A situation where the unmanned aerial vehicle loses its destination can be prevented.

In one embodiment of the present disclosure, the destination changed to a region other than the selected region can be a point where the unmanned aerial vehicle departed from. The destination changed to a region other than the selected region can be a point nearest to where the unmanned aerial vehicle is flying.

The destination can be changed to a point where the unmanned aerial vehicle departed from or a point nearest to where the unmanned aerial vehicle is flying when there is no region with the next highest priority. The unmanned aerial vehicle can be guided to a safe point.

One embodiment of the present disclosure can be a delivery system using an unmanned aerial vehicle. This system can be a system having a transmitting device and an unmanned aerial vehicle. The transmitting device can transmit to the unmanned aerial vehicle a plurality of regions of delivery locations of the unmanned aerial vehicle. The unmanned aerial vehicle can have a storage. The storage can store the plurality of regions of delivery locations transmitted by the transmitting device. The selecting unit can select a region having the highest priority as a destination of the unmanned aerial vehicle from among the plurality of regions. The changing unit can change the destination selected by the selecting unit to a region having the next highest priority when it is determined that a selected path to the destination is not suitable for flight.

One embodiment of the present disclosure can be an unmanned aerial vehicle control method. This control method can select a region having the highest priority as a destination from among a plurality of regions of the destination. The control method can determine whether a selected path to the destination is suitable for flight. The control method can change the selected destination to a region having the next highest priority when it is determined that a selected path to the destination is not suitable for flight.

One embodiment of the present disclosure can be a program for controlling an unmanned aerial vehicle. This program can cause a computer to: select a region having the highest priority as a destination from among a plurality of regions of the destination; determine whether a selected path to the destination is suitable for flight; and change the selected destination to a region having the next highest priority in a computer when it is determined that a selected path to the destination is not suitable for flight.

Note that forms that extract a portion of the configurations described above and combine the extracted configurations are included within the scope of the disclosure.

According to the present disclosure, a destination can be changed to a different region when it is difficult for a UAV to reach its destination.

DETAILED DESCRIPTION OF THE EMBODIMENTS

The embodiments of the present disclosure are described in detail below with reference to the drawings. Note that the configurations described in the embodiments below are only examples and the present disclosure is not limited to the configurations illustrated in the drawings. Portions of the configurations illustrated in the drawings can be replaced by another configuration.

The scope of the claims, specification, drawings, and abstract include matters subject to protection by copyright. The owner of copyright does not raise objections to duplication by any person of these documents if it is as displayed in the files or records of the Patent Office. However, in all other cases, all copyrights are reserved.

Before specific descriptions of embodiments, cases will be described for a use case where a UAV is used to deliver. In these cases, it can be realistically difficult for a UAV to reach its destination, When using a UAV for delivery, a location or the like of the recipient can be generally set in the UAV as a UAV destination (landing point) via a mobile terminal or the like of the recipient or the like. For example, the recipient can designate a destination point in advance on aerial map data provided on the cloud and the like, using a mobile terminal held by the recipient. The location information of this destination can be converted into latitude/longitude information and the like, used in a positioning system such as, for example, a GNSS. The recipient can then designate an altitude of the destination (for example, the number of floors in a structure) as location information. The location information designated by the recipient in this manner can be registered in a system of the service provider. The recipient can register current location information calculated in a positioning system such as a GNSS of a mobile terminal held by the recipient, to a system of the service provider as a destination. This is only an example, and registration of location information of a destination can be performed using various methods.

A destination registered in this manner can be set in the UAV by the service provider. Then, the UAV automatically can fly to the vicinity of the set location using a positioning system such as a GNSS. The UAV can approach the vicinity of the destination relatively easily.

However, it can be difficult for a UAV to reach an actual destination from the vicinity of the destination. Generally, UAVs often fly at points where there are relatively few obstacles between the current location and the vicinity of the destination. The points can be dozens of meters above the ground. Therefore, it is not that difficult for a UAV to reach the vicinity of the destination. However, it can often be difficult to reach the actual destination from the vicinity of the destination. Particularly in a use case of a UAV delivering a package, the destination can be a point with many buildings, and there can be many overhead wires. The destination can be a balcony or the like of a high-rise building. In this manner, flying can be difficult because there can be many obstacles surrounding the destination. In addition to obstacles, flying can be difficult due to, for example, strong winds and the like.

Figure 1:
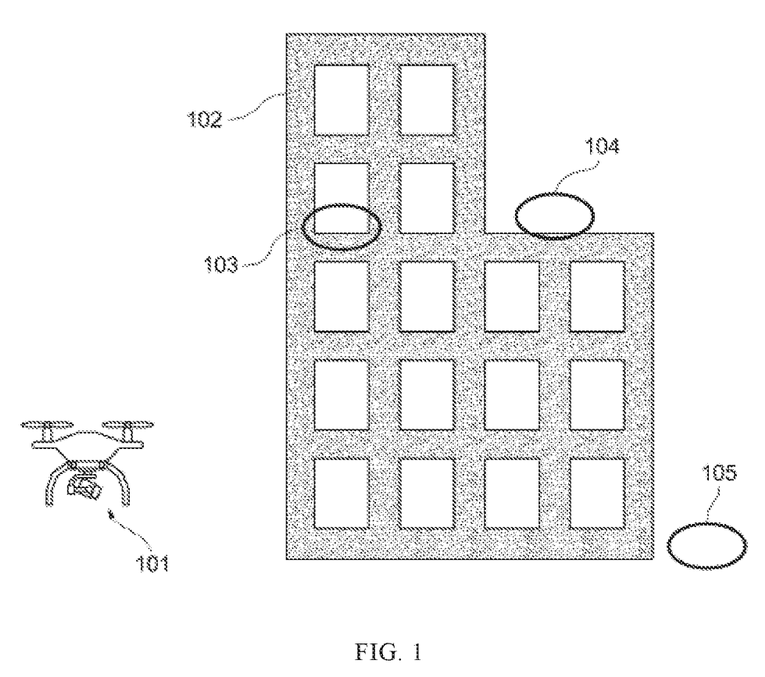
FIG. 1 describes a summary of an embodiment.

Specific examples will be described in a case where the destination set by the recipient is a balcony of an upper floor of a building. FIG. 1 is a conceptual diagram including a UAV 101 and a structure 102. The structure 102 here is a high-rise apartment. FIG. 1 is only a simplified description, and the size ratio between the UAV 101 and the structure 102, the number of floors of the structure 102, and the like, are not illustrated in the drawings.

In FIG. 1, the recipient can set a point 103 corresponding to the balcony of the floor where he/she lives as the destination in the UAV 101 using various kinds of information processing devices such as a mobile terminal. Note that the destination of the UAV 101 is to be set using the recipient's mobile terminal or the like in this description, but the present disclosure is not limited to this. For example, a mobile terminal or the like of the deliverer that has received information of a predetermined destination from the mobile terminal or the like of the recipient, or system management device can set the destination of the UAV 101 to the point 103 in the UAV 101. For example, the system management device that manages the UAV 101 can set the destination in the UAV 101 using location information of the destination received from the mobile terminal or the like of the recipient.

Generally, points with high altitude can have higher wind speeds than points with low altitude. Therefore, there can be times when a UAV 101 cannot reach the destination point 103 due to the effects of strong winds around the upper floors. This can be when the UAV 101 draws near to the destination at an altitude lower than the altitude of a destination upper-floor balcony, and then rises toward the upper-floor balcony. Alternatively, there can be also times when the destination balcony is covered by some kind of obstacle even though the UAV 101 has reached the altitude of the destination point 103. This can also result in the UAV 101 being unable to reach the point 103. In this manner, a state in which the UAV 101 cannot reach the destination cannot be recognized before the UAV 101 takes off. In actuality, it is often true that a state in which a UAV 101 cannot reach the destination can only be recognized after the UAV flies near the destination. The point can also be called a region.

Conventionally, when it is difficult to reach a destination, for example, the UAV 101 carries out a control such as automatically flying back to the takeoff point, searching for the nearest safe point and landing at this point, or hovering and waiting.

However, the original object of the recipient receiving the package cannot be achieved with this kind of control. The recipient's main object is to receive the package, which is merely a supplementary desire of wanting to receive it at the easiest location possible. For example, it can be assumed that the recipient wants the package to be delivered to the point 103, which is the upper-floor balcony that the recipient lives in. In this case, the main object of the recipient receiving the package can be achieved by delivering the package to a point 104 or a low altitude point. The point 104 can be a dedicated UAV port installed on the building in which the recipient lives. The low altitude point can be near the building in which the recipient lives, for example, a point 105 and the like. The point 105 can be a dedicated UAV port installed at a park and the like.

In a process for delivering a package in the embodiment described below, a technique is described. The technique can allow a plurality of regions (points) that are candidates for the destination to be set in the UAV, and the UAV to change the destination to a predetermined destination from among the plurality of regions based on the conditions. The package can be safely and surely handed to the recipient by this technique.

In the embodiment described below, the destination refers to the destination currently set in the UAV. In other words, The UAV can fly toward the destination. Meanwhile, a destination candidate refers to a candidate region (point) of the destination that can be set in the UAV. When the UAV changes the destination from candidate X to candidate Y, it can be changed from a state wherein the point of candidate X is set as the destination to a state wherein the point of candidate Y is set as the destination. The UAV can then switch the path to the region (point) of candidate Y and fly.

When delivering a package to a recipient in the present embodiment, a plurality of destination regions can be set in the UAV 101. A priority can be given to the plurality of regions. The priority can be given based on, for example, instructions from the mobile terminal or the like of the recipient. The recipient can enter instructions to, for example, a mobile terminal or the like, giving priority in order of personal convenience. The priority instruction can be set in the UAV by a system management device that has received the instruction from, for example, the mobile terminal or the like of the recipient. Alternatively, the mobile terminal or the like of the recipient can set the priority instruction in the UAV 101. Below, the subject that carries out the setting in the UAV 101 is simply called the user. Note that user here is a concept including the recipient, deliverer, system manager or the like. In other words, the user can be simply a user that uses the UAV 101, and is not limited to the recipient. The region of the destination for delivery and the priority thereof can be set in the UAV 101 by the user's terminal. Note that an entry device and the like can be directly connected to the UAV 101, and the region and priority of the destination can be set in the UAV 101 without using a terminal. The region and priority of the destination can also be set in the UAV 101 by attaching a portable memory to the UAV 101. The portable memory can have the region and priority of the destination stored thereon.

In the example of FIG. 1, priority can be given in order of convenience to the recipient. Specifically, the point 103 can have the highest priority, and the point 104 can have the next highest priority. A point 105 can be set as the lowest priority. The UAV 101 can set a high priority region as the destination and can carry out flight control. At this time, if the path to the destination is not suitable for flying the UAV 101, for example, if wind speeds are too fast, the UAV 101 can set another region as the destination, and can carry out flight control toward the new destination. The detailed process will be described below.

Figure 2:
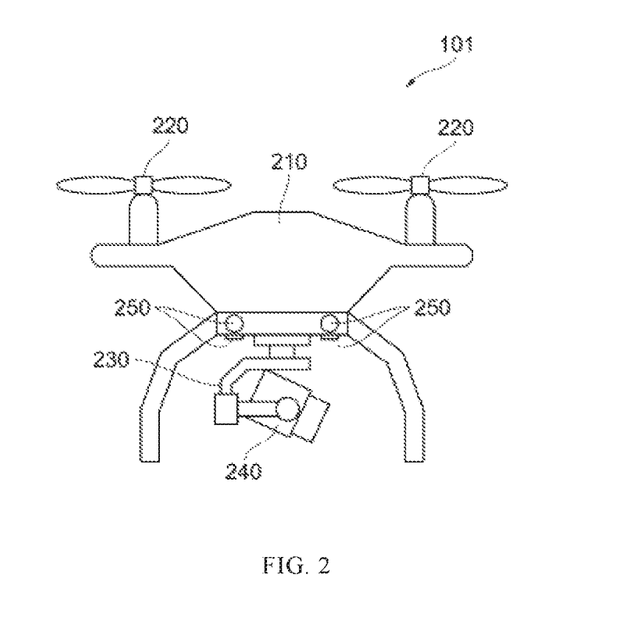
FIG. 2 illustrates an example of the exterior of a UAV.

FIG. 2 illustrates an example of the exterior of the UAV 101 of the embodiment. The UAV 101 can include a UAV body 210, a plurality of rotary wings 220, a gimbal 230, and imaging devices 240 and 250.

By controlling the rotation of the plurality of rotary wings 220, the flight of the UAV body 210 can be controlled. In the present embodiment, an example will be described with a UAV 101 having rotary wings. For example, the UAV 101 can be configured to have four rotary wings. The number of rotary wings is not limited to four, and there can be any number of rotary wings. The UAV 101 can be a UAV having fixed blades without rotary wings. The UAV 101 can be a UAV having both rotary wings and fixed blades.

The gimbal 230 can rotatably support the imaging device 240 on the UAV body 210. The gimbal can rotatably control the imaging device 240 with, for example, a yaw axis, pitch axis and roll axis as the center.

The imaging device 240 can capture an image of objects around the UAV body 210 and can obtain image data. The imaging device 240 can be rotatably controlled by the gimbal 230.

The plurality of imaging devices 250 can be sensing cameras for controlling the flight of the UAV 101. For example, two imaging devices 250 can be provided in the front on the nose of the UAV body 210. Two imaging devices 250 can be provided on the lower surface of the UAV body 210. Distances around the UAV body 210 can be found using a parallax of the images captured by the pair of two imaging devices 250.

Other devices, mechanisms, and the like not illustrated in the drawings can be provided on the UAV 101. For example, various lasers, sensors, and the like described below can be provided. A mounting mechanism can be provided on the UAV 101 for mounting a package. The mounting mechanism can be an arm-shaped mechanism that holds a package. The mounting mechanism can be a base mechanism for stacking a package. The mounting mechanism can be any mechanism. In FIG. 2, the mounting mechanism is described as a configuration having the imaging device 240, but does not necessarily require the imaging device 240.

Figure 3:
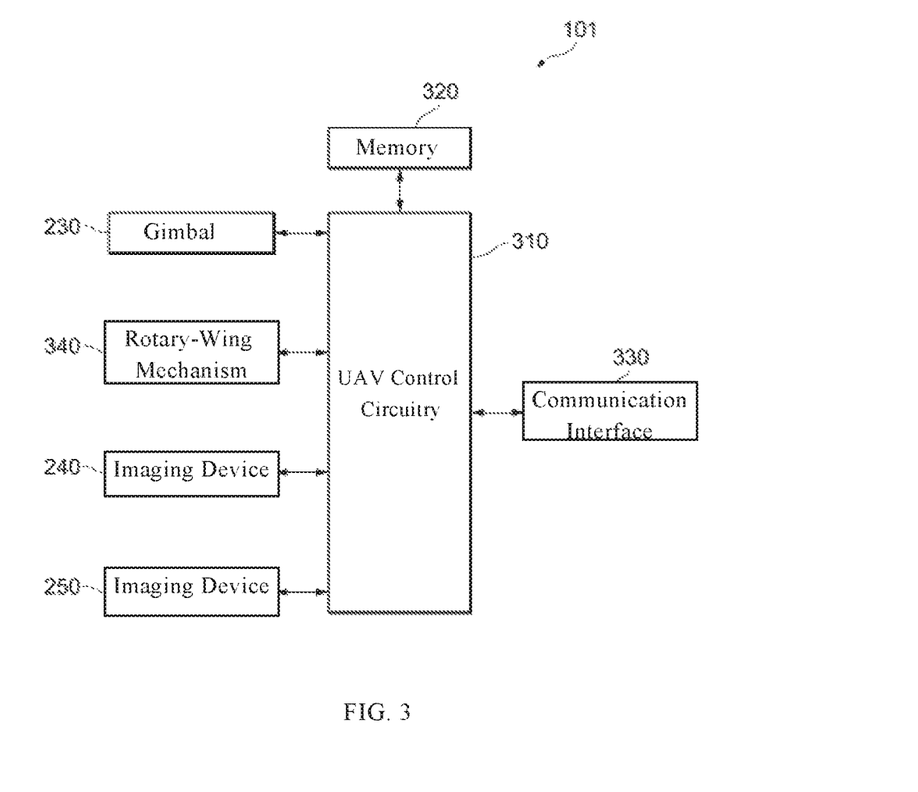
FIG. 3 is a block diagram illustrating the configuration of a UAV.

FIG. 3 illustrates an example of a block diagram of the configuration of the UAV 101 according to the embodiment. The UAV 101 can have a UAV control circuitry 310 that can control the entire UAV, a memory 320, and a communication interface 330. The UAV control circuitry 310 can control a rotary-wing mechanism 340, the gimbal 230, and the imaging device 240.

The UAV control circuitry 310, for example, can control the entire UAV following a software program housed in the memory 320. The UAV control circuitry 310 can control the entire UAV following instructions received from a remote controller terminal and the like via the communication interface 330. For example, the UAV control circuitry 310 can control the flight of the UAV, and can control imaging of the imaging device 240. The UAV control circuitry 310 can be configured by, for example, a microprocessor such as a CPU or MPU, a microcontroller such as an MCU, or the like.

The memory 320 can house a software program that controls the entire UAV. The memory 320 can house various data and information such as the region and priority of the set destination, various log information of the UAV 101, and image data captured by the imaging devices 240 and 250. A computer readable recording medium can be used as the memory. For example, flash memory such as SRAM, DRAM, EEPROM, or USB memory can be used. The memory 320 can be removable from the UAV 101.

The communication interface 330 can receive instructions from the remote controller terminal via wireless communication, and can transmit various data and information housed in the memory of the UAV 101. The communication interface 330 can receive a signal from a GNSS positioning system.

The imaging devices 240 and 250 can be configured to include at least a lens and an imaging sensor.

The rotary-wing mechanism 340 can be configured to include the plurality of rotary wings 220, and a plurality of drive motors that rotate the plurality of rotary wings 220.

Figure 4:
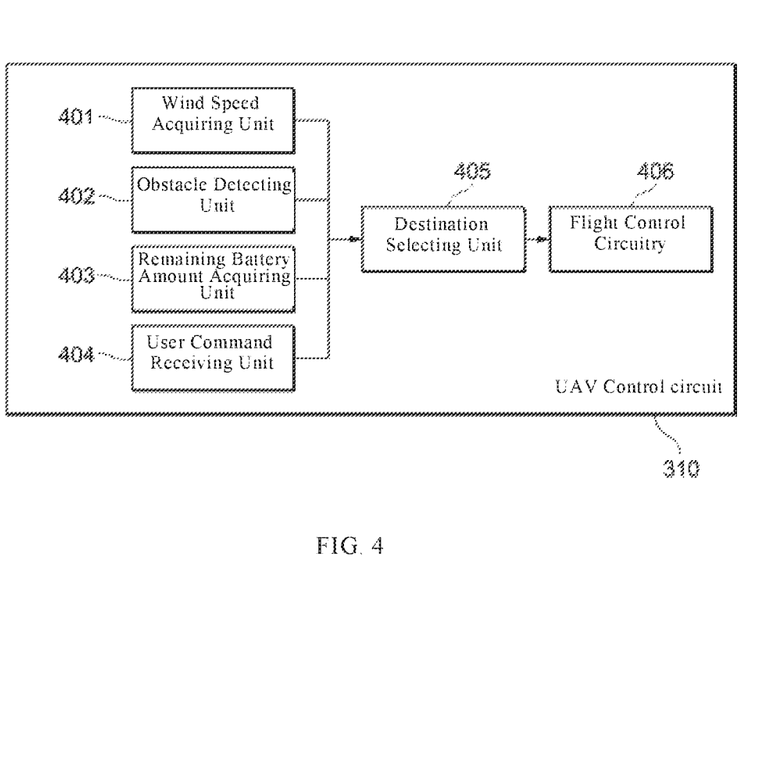
FIG. 4 is a block diagram illustrating the configuration of a UAV control circuitry.

FIG. 4 illustrates an example of a function block diagram of the UAV 101 according to the present embodiment. The function block diagram illustrated in FIG. 4 can be, for example, the function block diagram of the UAV control circuitry 310. The UAV control circuitry 310 can have a wind speed acquiring unit 401, an obstacle detecting unit 402, a remaining battery amount acquiring unit 403, a user command receiving unit 404, a destination selecting unit 405, and a flight control circuitry 406.

The wind speed acquiring unit 401 can acquire the wind speed when the UAV 101 is in flight. The UAV 101 can include an anemometer. The wind speed acquiring unit 401 can acquire a value obtained using an anemometer.

The UAV 101 can include an inertial measurement unit (IMU). The IMU can include three gyro sensors or three acceleration sensors for the three orthogonal axes. The wind speed acquiring unit 401 can calculate the wind speed based on the acceleration and angular velocity obtained by the IMU. For example, it can be assumed that the UAV 101 was supposed to move to the calculated position A being controlled by the flight control circuitry 406 of the UAV 101, but the UAV 101 actually moves to position A' as a result of calculating based on the value obtained by the IMU. The wind speed acquiring unit 401 can calculate the wind speed based on such relationship between position A' and position A.

The wind speed acquiring unit 401 can acquire information indicating the wind speed of the path from the exterior via the communication interface 330. The wind speed acquiring unit 401 can predict the wind speed considering predetermined environmental conditions with the wind speed currently being acquired, and can acquire such predicted wind speed information. For example, it can predict changes in the wind speed currently being acquired from the topography, altitude, and the like where the UAV 101 is flying, and can acquire wind speed information of the predicted results.

In addition, the wind speed acquiring unit 401 can acquire the wind speed when the UAV 101 is flying using a predetermined value (for example, average value) using a plurality of values obtained from the plurality of acquiring methods described above.

The above example is only an example, and wind speed can be acquired by any aspect. The acquiring process of wind speed by the wind speed acquiring unit 401 can be performed at predetermined intervals (for example, one second intervals).

The obstacle detecting unit 402 can detect obstacles in the path of the UAV 101. Obstacles can be objects that exist in the path of the UAV 101 and can affect the flight of the UAV 101. Buildings, structures such as bridges, trees, utility poles, overhead wires, and the like can be given as examples of obstacles. As described in the example of a balcony, objects that are close to the destination that are a hindrance to landing can be examples of obstacles. For example, packages scattered on the destination balcony, sunshades, and the like can be given. Note that these are only examples, and an obstacle is not limited to these examples.

The topography of the landing point of the UAV 101 can be treated as an obstacle. Generally, it is preferable for the landing point of the UAV 101 to be a flat region. Therefore, when the destination is an inclined surface and the like, the obstacle detecting unit 402 can detect that there is an obstacle at the destination.

The obstacle detecting unit 402 can detect an obstacle using, for example, an ultrasonic sensor. An ultrasonic sensor, for example, can emit ultrasonic waves at an object, and can receive the reflected waves using an echo sounder receiver. As a result, it can detect the existence of an object and the distance to an object.

The obstacle detecting unit 402 can detect an obstacle by the time-of-flight (ToF). The UAV 101 can include a laser light source and a sensor used for ToF. The obstacle detecting unit 402 can measure the distance to an obstacle based on the flight time of the light from when the projected laser is reflected from the object until it is detected by the sensor. The obstacle detecting unit 402 can detect an obstacle based on this measured distance to the object.

The obstacle detecting unit 402 can detect an obstacle by an image captured by a stereo camera. The UAV 101 can include the plurality of imaging devices 250. The obstacle detecting unit 402 can calculate the distance from the UAV 101 to an object using a parallax between images captured by the plurality of imaging devices 250. The UAV 101 can detect an obstacle based on this calculated distance.

The obstacle detecting unit 402 can combine the detecting methods described above. In other words, when an obstacle has been detected using any of the detecting methods described above, the obstacle detecting unit 402 can determine that there is an obstacle. Alternatively, it can be determined that there is an obstacle when an obstacle has been detected using at least two methods of the plurality of detecting methods.

The obstacle detecting unit 402 can measure the number of times that obstacles are detected in a fixed period of time. When the number of times that the obstacles are detected in a fixed period of time is less than a predetermined number, it can be determined that there is no obstacle. For example, one example can be when there are obstacles that dynamically change position such as a bird. There can be cases where a bird is detected as an obstacle, it is detected as an object for an instant, but then leaves by a predetermined timing thereafter and is no longer detected as an obstacle. In this case, an obstacle temporarily detected does not affect the flight of the UAV 101. Therefore, the obstacle detecting unit 402 can carry out obstacle detection for a fixed period of time, and the obstacle detecting unit 402 can determine that there is no obstacle if the number of times that obstacles are detected is the number of times of detection less than a predetermined number of times in the fixed period of time.

The above example is only an example, and obstacles can be detected using any aspect.

The remaining battery amount acquiring unit 403 can acquire a remaining battery amount of the UAV 101. The remaining battery amount acquiring unit 403 can check the battery and acquire the remaining amount value thereof. The remaining battery amount acquiring unit 403 can predict the remaining battery amount to be used based on current flight conditions of the UAV 101 (for example, temperature, altitude, velocity, wind speed, and the like) and the remaining amount value of battery. The remaining battery amount acquiring unit 403 can acquire the value predicted in this manner as a remaining battery amount. The remaining battery amount acquiring unit 403 can acquire the remaining battery amount based on the current position of the UAV 101 and the position of the destination.

The user command receiving unit 404 can receive commands from a user's terminal and the like outside the UAV 101 via the communication interface 303. A command for changing priority can be given as an example of received commands. For example, as described above, the priority of the destination regions can be set in the order of points 103, 104, then 105 in the example in FIG. 1. Here, when an instruction for increasing the priority of point 104 is included in the command received by the user command receiving unit 404, the priority of the regions set in the UAV 101 can be changed to have a higher priority in the order of points 104, 103, and 105.

The user command receiving unit 404 can receive a command that can change priority while the UAV 101 is in flight. The user command receiving unit 404 can receive a command for changing priority before takeoff. The received command can be a command for changing the priority of any region from among the plurality of regions set in the UAV 101. The received command can be a command for resetting all priorities of the set plurality of regions in the UAV 101.

The user command receiving unit 404 can receive a command for requesting that a region of a new destination that has not yet been set is set along with a priority, in addition to a command for changing the priority of a region set in the UAV 101. In other words, the user command receiving unit 404 can receive a command for adding a destination region.

The user command receiving unit 404 can change a score of each evaluation item that can be the basis for the risk level score described below to a user designated value. In other words, the user command receiving unit 404 can receive a command for changing a score based on information acquired by each of the wind speed acquiring unit 401, the obstacle detecting unit 402, and the remaining battery amount acquiring unit 403 to a user designated value. The risk level score will be described below.

The destination selecting unit 405 can select a destination from among the plurality of set regions. The destination selecting unit 405 can select a destination from among regions stored in, for example, the memory 320. As described above, the plurality of regions set in the UAV 101 and the priority thereof can be stored in the memory 320.

The destination selecting unit 405 can select a specific region as the destination from among the plurality of regions based on the priority of the regions stored in the memory 320. For example, when a package is mounted and the UAV 101 takes off toward the destination, the destination selecting unit 405 can set a region as the destination following the priority. In the example in FIG. 1, the point 103, which has been given the highest priority, can be selected as the destination when the UAV takes off.

The destination selecting unit 405 can select a destination based on the priority of the plurality of regions stored in the memory 320, and information obtained from at least one of the wind speed acquiring unit 401, the obstacle detecting unit 402, the remaining battery amount acquiring unit 403, and the user command receiving unit 404. For example, when the UAV 101 is flying toward the destination point 103, the destination selecting unit 405 can switch the destination from the point 103 to, for example, the point 104 or the point 105. The detailed process of the destination selecting unit 405 will be described below.

The flight control circuitry 406 can control the flight of the UAV 101. The flight control circuitry 406 can control the flight of the UAV 101 by controlling the rotation of the plurality of rotary wings 220. The flight control circuitry 406 can determine the path, for example, toward the destination selected by the destination selecting unit 405 based on a positioning signal from the GNSS, and can control to automatically fly the UAV 101. When a setting has been changed by the destination selecting unit 405, the flight control circuitry 406 can control the flight of the UAV 101 toward the changed destination.

Figure 5:
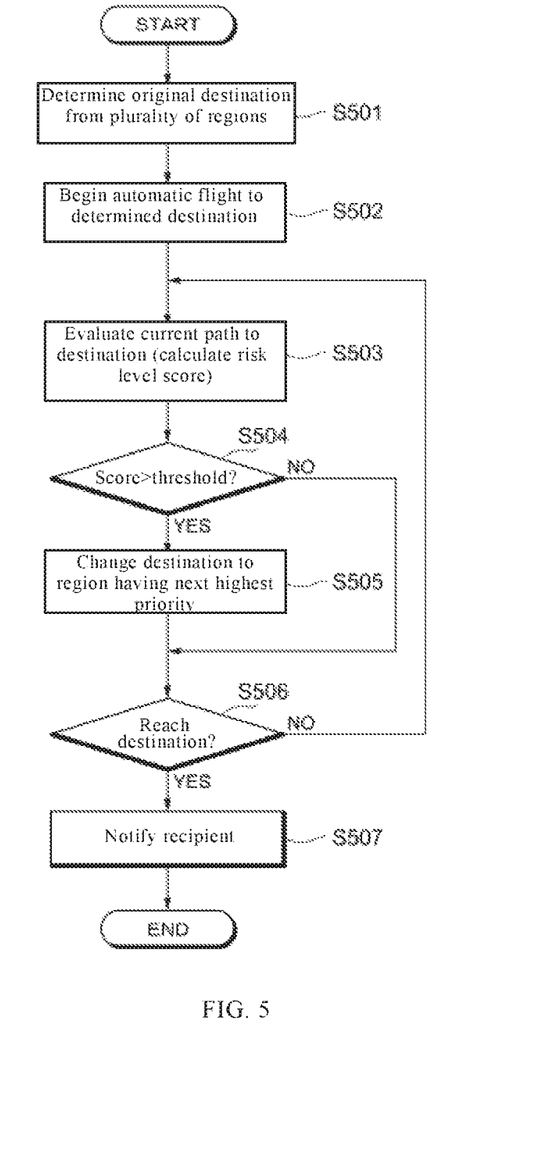
FIG. 5 illustrates an example of a flowchart.

FIG. 5 illustrates an example of a flowchart including a process executed by the destination selecting unit 405 and the flight control circuitry 406. As described above, points 103 to 105 can be set as the plurality of regions in the UAV 101 by the user, and can be set to have high priority in the order of points 103, 104, and 105.

In S501, the destination selecting unit 405 can determine the original destination from among the plurality of regions. In S501, the destination selecting unit 405 can determine the region with the highest priority as the destination from among the plurality of regions. The process of S501 can be, for example, a process executed before the UAV 101 takes off.

In S502, the flight control circuitry 406 can begin automatic flight toward the destination determined in S501. The flight control circuitry 406 can determine the path based on the positioning signal from the GNSS, and can carry out flight control toward the destination.

In S503, the destination selecting unit 405 can evaluate the current path to the destination. For example, the destination selecting unit 405 can evaluate the current path to the destination based on information obtained from at least one of the wind speed acquiring unit 401, the obstacle detecting unit 402, and the remaining battery amount acquiring unit 403. Dynamically calculating the risk level score can be given as an example of evaluating the path.

The risk level score can be a score calculated in the destination selecting unit 405 based on information obtained from at least one of the wind speed acquiring unit 401, the obstacle detecting unit 402, the remaining battery amount acquiring unit 403, and the user command receiving unit 404. Higher score means higher risk of the path.

Figure 6:
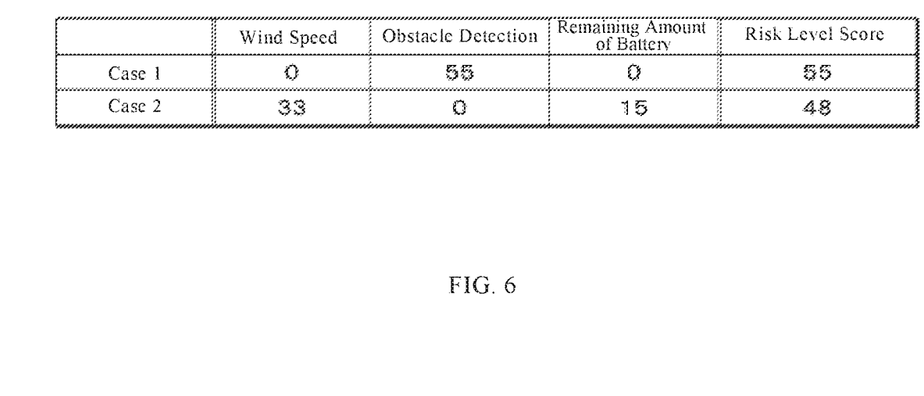
FIG. 6 illustrates an example of a risk level score.

FIG. 6 illustrates an example of the calculated risk level score. In FIG. 6, an example is illustrated wherein the destination selecting unit 405 can calculate scores for each information obtained from the wind speed acquiring unit 401, the obstacle detecting unit 402, and the remaining battery amount acquiring unit 403, and a value totaling the calculated scores can be calculated as the risk level score.

The destination selecting unit 405 can be configured to include an evaluation calculating unit not illustrated in the drawings. The evaluation calculating unit can evaluate the current path to the destination. For example, the evaluation calculating unit can evaluate the current path to the destination based on at least one evaluation item that can affect the path.

The evaluation calculating unit can be configured to include a score calculating unit. The score calculating unit can calculate the risk level score described above. The score calculating unit, for example, can calculate each score of each evaluation item. The score calculating unit can calculate a value totaling each of the calculated scores as the risk level score.

The destination selecting unit 405 can be configured to include a determining unit that can determine whether the current path to the destination is suitable for flying based on results evaluated by the evaluation calculating unit. The determining unit can determine that the current path toward the destination is not suitable for flying the UAV when the value of the score calculated in the score calculating unit exceeds a predetermined threshold value.

The destination selecting unit 405 can be configured to include a changing unit that can change the destination region currently selected to another region.

The calculation of the score, for example, can be found by entering information obtained from each unit into a conversion formula prepared in advance, corresponding to each of the wind speed acquiring unit 401, the obstacle detecting unit 402, and the remaining battery amount acquiring unit 403. Alternatively, a table in which information that would be obtained from each unit and the score are associated with each other can be stored to the memory 320 in advance. The score corresponding to enter information can be found by referencing the table stored to the memory 320.

The calculation of the score can be done by adding a predetermined weight, based on the current destination. For example, when an upper-floor balcony is set as the destination, the wind speed could well be high around the upper floors compared to the lower floors. Therefore, when calculating the wind speed score in the case where the destination is an upper-floor balcony, the simply added score can be, for example, multiplied by 1.3 and the like, and the wind speed score can be corrected at a predetermined weight.

The wind speed score can be calculated by the destination selecting unit 405 using information acquired from the wind speed acquiring unit 401. The remaining battery amount score can be calculated by the destination selecting unit 405 using the remaining battery amount acquired from the remaining battery amount acquiring unit 403. Alternatively, the remaining battery amount score can be calculated as the score of the probability of the UAV reaching its destination based on the remaining battery amount acquired by the remaining battery amount acquiring unit 403, and the current remainder of the path to the destination. The remaining battery amount score can be also a score relating to the wind speed score. If the wind speed is high (wind speed is fast), the remaining battery amount score can also rise (the remaining amount decreases because battery use increases). In this manner, the score can include a score relating to another score, and can include a score not relating to another score. It can be said that the obstacle detection score is a score not relating to another score.

The obstacle detection score can be calculated from the size of obstacles, the relationship of the relative position of obstacles in the path of the UAV 101 and the like, by referencing the conversion formula or table described above.

Case 1 in FIG. 6 illustrates an example wherein the destination selecting unit 405 of the UAV 101 can calculate each score based on information obtained at a certain time from the wind speed acquiring unit 401, the obstacle detecting unit 402, and the remaining battery amount acquiring unit 403 while flying a path. In case 1, the scores of the wind speed and remaining battery amount are both zero. In case 1, the score of the wind speed and the remaining battery amount can indicate that the risk is low in the current path to the destination. Meanwhile, the obstacle detection score is 55. The risk level score in case 1 can be calculated as 55 from 0+55+0.

Meanwhile, in case 2, the obstacle detection score is 0, the wind speed score is 33, and the remaining battery amount score is 15. As a result, the risk level score in case 2 can be calculated as 48 from 33+0+15.

For example, a predetermined threshold can be provided in the risk level score. The destination selecting unit 405 can determine that the current path to the destination is dangerous when the calculated risk level score exceeds the predetermined threshold. For example, if 40 is employed as the predetermined threshold, it is determined in both case 1 and case 2 that the current path to the destination is dangerous. For example, a state with a wind speed of 10 m/s can be made to correspond with a score of 40.

When it is detected that the risk level score has exceeded the predetermined threshold value, the destination selecting unit 405 can instantly evaluate that the current path to the destination is dangerous. Alternatively, when the risk level score has exceeded the predetermined threshold, the destination selecting unit 405 can continue the evaluation of the risk level score for a fixed period of time, and can determine that the current path to the destination is dangerous once the risk level score continues to exceed the predetermined threshold for a fixed period of time.

A risk level score can be explained, for example, that the higher the score is, the higher the risk of the path, but the present disclosure is not limited to this. A risk level score that can indicate higher risk of the path with a lower score can be used.

The score is described as being calculated by the destination selecting unit 405, but the score can be calculated in the wind speed acquiring unit 401, the obstacle detecting unit 402, and the remaining battery amount acquiring unit 403, and this score can be used by the destination selecting unit 405.

The score can be changed into any value based on a command from the user received in the user command receiving unit 404.

In FIG. 4, a risk level score calculated from totaling each score value is given as an example, and it is described that the destination selecting unit 405 can determine that the current path to the destination is dangerous when the risk level score exceeds a predetermined threshold, but the present disclosure is not limited to this. For example, a predetermined threshold can be set for each of the plurality of evaluation items (described from the example of the configuration in FIG. 2, items: the wind speed, obstacles, and remaining battery amount). When it is detected that at least one evaluation item from among the plurality of evaluation items exceeds the predetermined threshold, the destination selecting unit 405 can evaluate that the current path to the destination is dangerous regardless of values of other evaluation items.

Next, the description will be continued returning to FIG. 5.

The destination selecting unit 405 in S504, can determine whether the risk level score calculated in S503 exceeds the threshold value. As described above, with the determination in S504, a determination can be carried out as to whether at least one score from among the plurality of evaluation items exceeds the threshold value, or a determination can be carried out as to whether the total score of the plurality of evaluation items exceeds the threshold value.

When the calculated risk level score exceeds the predetermined threshold value, the process can proceed to S505, and the destination selecting unit 405 can change the destination from the currently set region to the region with the next highest priority. For example, the destination can be changed from the point 103 to the point 104 in FIG. 1. The flight control circuitry 406 can then control the flight of the UAV 101 toward the changed destination. Then the process can proceed to S506. When the risk level score exceeds the predetermined threshold value, it can be said that the UAV 101 is in a preset state.

Meanwhile, when the calculated risk level score does not exceed the predetermined threshold, the process of S504 can be omitted, and the process can move to S506.

The destination selecting unit 405 in S506 can determine whether the destination has been reached. Whether the destination has been reached can be determined using, for example, a GNSS. The UAV 101 can capture an image of a marker disposed at the destination, and the destination selecting unit 405 can determine whether the destination has been reached based on whether the UAV 101 has landed on a position where the marker is disposed. The present disclosure is not limited to these examples, and the destination selecting unit 405 can use any method to determine whether a destination has been reached.

When the destination selecting unit 405 determines that the destination has been reached in S506, the destination selecting unit 405 can proceed the process to S507. When it is determined that a destination has not been reached, the process can be returned to S503 and repeated.

In other words, when the destination is selected as the region with the next highest priority in S505, the destination selecting unit 405 can newly evaluate the path with the selected region as the destination. The destination selecting unit 405 can newly calculate the score with the selected region as the destination. At this time, because the calculated score is a score with the newly selected region as its destination, it can be different from the previous score. For example, the destination before the change can be an upper floor, and the destination after the change can be a lower floor. The probability of the wind speed score being low is higher at lower floors than at higher floors. In S504 the second time, there can be times when the score for the newly selected lower floor region does not exceed the threshold value. In this case, the UAV is controlled and flown to the destination of the newly selected lower floor region.

In S507, the UAV 101 can notify the mobile terminal or the like of the recipient what destination (in other words, what region) the UAV 101 has reached. This is because in the present embodiment, there can be times when the recipient heads toward a destination different than the destination that the UAV 101 has reached because the UAV 101 can automatically change the destination. In S507, for example, the UAV control circuitry 310 can notify the destination that the UAV 101 has reached to the mobile terminal or the like of the recipient via the communication interface 330. The UAV control circuitry 310 can notify the reached destination to the system management device via the communication interface 330, and the system management device that has received this notification can notify the destination that the UAV 101 has reached to the mobile terminal or the like of the recipient.

In the flowchart in FIG. 5, it is described that the reached destination can be notified to the mobile terminal or the like of the recipient when the UAV 101 reaches the destination, but the present disclosure is not limited to this. For example, when the destination is changed by the process in S505, the changed destination can be notified to the mobile terminal or the like of the recipient.

In the embodiment described above, wind speed, obstacle detection, and amount of remaining battery are described as examples of factors used for calculating the risk level score. However, the present disclosure is not limited to these examples, and the factors can optionally include and can be appropriately combined with environmental factors that affect the flight of the UAV. For example, a heavy rainstorm can occur causing a large amount of precipitation locally. Weather conditions other than such wind speeds can also affect the flight of the UAV. Therefore, a precipitation forecast and the like can be used as a factor used for calculating the risk level score.

When delivery by a UAV is commonly carried out, UAVs can congest around the destination. When UAVs congest in this manner, the probability of collision between UAVs can rise, and interference of communication channels can occur. Therefore, traffic information that indicates the congestion of UAVs around the destination can also be used as a factor used for calculating the risk level score.

When using the plurality of imaging devices 250 for obstacle detection, the detectable sensitivity can be reduced depending on the surrounding light. For example, time information can be used as a factor used for scoring obstacle detection, or the calculated obstacle score can be amended by time information.

In the embodiment described above, evaluation of a UAV path can be carried out by scoring the risk level and accumulating risk level scores. However, the safety level can be scored for evaluation, and the safety level scores can be accumulated to evaluate a UAV path.

In the embodiment described above, it is described that the plurality of regions of the destination can all have different priorities, but the present disclosure is not limited to this. For example, a configuration can be employed wherein a portion of the regions from among the priorities of the plurality of regions have the same priority. For regions having the same priority, selecting which region to be the destination can be determined by the destination selecting unit 405 following predetermined conditions. For example, the destination selecting unit 405 can select a region with the shortest flight distance as the destination based on the current flight position of the UAV 101 and the position of each region having the same priority.

Alternatively, the destination selecting unit 405 can calculate each risk level score when each region having the same priority are set as the destination based on information received from at least one of the wind speed acquiring unit 401, the obstacle detecting unit 402, the remaining battery amount acquiring unit 403, and the user command receiving unit 404. Then, the destination selecting unit 405 can select the region with the lowest calculated risk level score value as the destination. In other words, when a plurality of regions have the same priority, a region can be selected as the destination having a safer path considering current flight conditions.

The process for evaluating the current path to the destination described in S503 can be started when the UAV 101 reaches a predetermined distance from the destination. As described until now, the destination of the UAV 101 can be changed from the currently set region to another region. However, until the predetermined distance from the destination is reached, a common path can be mostly employed even if a path is set having any region as its destination. This is because it is inconvenient for the recipient when a region is set too far away. Therefore, it is presumed that each of the plurality of set regions can be generally scattered within the predetermined distance. The UAV 101 can well employ the same path until the predetermined distance from the destination regardless of which region is made to be the destination. If the UAV 101 is located at a point where the path is not switched even if the destination is changed, the process for evaluating the path described in S503 can be omitted. Note that whether the predetermined distance from the destination is reached can be determined, for example, by the UAV 101 using the GNSS.

It is described that in S505, the destination selecting unit 405 can carry out a process for changing the destination to the region with the next highest priority based on the regions and priorities stored in the memory 320. When carrying out S505, for example, there may be times when the priority is changed by the user command receiving unit 404, or when a region different from the original region is added with a high priority. In these cases, the destination can yet again be changed to the region with the highest priority from among all of the set regions. In other words, when a command is received in the user command receiving unit 404, a process for changing the current destination to a region with the highest priority from among the plurality of set regions can be carried out as an interruption process.

Even after changing the destination in order of the highest priority from among the plurality of regions in the process in S505 and changing the destination to the region with the lowest priority, there may be times when the current path to the destination (in other words, the region with the lowest priority) is evaluated as dangerous. In these cases, the destination selecting unit 405 can carry out a process for changing the destination to the departure point, nearest safe point, and the like. In other words, because the flight can be dangerous regardless of which region is set as the destination and flown to, the flight control circuitry 406 can carry out a control such as landing the UAV 101 at a safe point, or hovering and waiting.

Note that when insufficient remaining battery amount is the reason for evaluating that the path is dangerous, the flight control circuitry 406 can carry out a process for changing the destination to a nearest point nearest where charging is possible.

When the destination is switched to a plurality of regions, the reason the flight has been evaluated as dangerous may disappear while the UAV 101 is flying to the vicinity of the region. Therefore, a process can be carried out as follows. The UAV 101 can carry out flight control after changing the destination in order from the region with the highest priority. Note that the path can be evaluated as dangerous even at the time that the destination is changed to the region with the lowest priority. In this case, evaluation can be carried out after yet again changing the region with the highest priority to the destination.

In the embodiment described above, it is described that the UAV 101 can deliver a package and the recipient can receive a package delivered by the UAV 101, but the present disclosure is not limited to this. For example, it can be applied to a use case wherein a package is collected. In other words, the user can set a plurality of regions of a location to collect a package along with a priority in the UAV 101. The UAV 101 can fly after setting a region based on the priority as the destination from among the set regions. When collecting a package, the weight of the collected package can be included as a factor used for calculating the risk level score because the weight of the package can affect the remaining battery amount on the return path of the UAV.

Each unit for realizing the functions of the embodiment described above can be implemented as, for example, hardware or software. When implementing as software, the program code for controlling the hardware can be executed by various processors such as a CPU or MPU. Hardware such as circuitry can be included for realizing the functions of the program code. A portion of the program code can be realized as hardware, and the rest can be executed by various processors.

According to the embodiment described above, the destination can be changed to another region when it is difficult for the UAV 101 to reach the destination. Particularly, because the destination can be changed to another region based on the actual conditions of the destination, it can be also suitable for, for example, sudden changes in the environment at the location of the destination.

The embodiment described above describes using the UAV 101 mainly for delivery. As described above, the main object for delivery can be for the recipient to receive a package. According to the process of the present embodiment, the main object of the recipient receiving a package can be achieved even if the destination is changed. Generally, for example, a destination can be changed for a passenger aircraft and the like due to bad weather and the like. When such a change is carried out, the main object of using a passenger aircraft for the passengers to reach the destination cannot be achieved. The technique described in the present embodiment can still achieve the main object of using a UAV for the recipient to receive a package even if the destination is changed.

DESCRIPTION OF THE REFERENCE NUMERALS

101 UAV
210 UAV body
220 Rotary wings
230 Gimbal
240 Imaging device
250 Imaging device
310 UAV control circuitry
320 Memory
330 Communication interface
340 Rotary-wing mechanism
401 Wind speed acquiring unit
402 Obstacle detecting unit
403 Remaining battery amount acquiring unit
404 User command receiving unit
405 Destination selecting unit
406 Flight control circuitry

What is claimed is:
1. An unmanned aerial vehicle comprising:
a storage storing:
information regarding a plurality of regions, the plurality of regions being destination candidates for delivering a package and each being associated with a priority determined according to an instruction received from a recipient of the package; and
a threshold; and
a control circuitry configured to:
select a first one of the plurality of regions that has a highest priority among the plurality of regions as a destination for delivering the package; and
after the unmanned aerial vehicle takes off and before the unmanned aerial vehicle reaches the first one of the plurality of regions:
calculate a risk level score for delivering the package to the first one of the plurality of regions;
determine, in response to the risk level score exceeding the threshold, that the first one of the plurality of regions is not suitable for delivering the package; and
change, in response to determining that the first one of the plurality of regions is not suitable for delivering the package, the destination to a second one of the plurality regions that has a next highest priority among the plurality of regions.

2. The unmanned aerial vehicle of claim 1, wherein the information includes a plurality of priorities each assigned to one of the plurality of regions.

3. The unmanned aerial vehicle of claim 2, wherein the control circuitry is further configured to:
receive a priority change instruction; and
change the priority of each of one or more of the plurality of regions according to the priority change instruction.

4. The unmanned aerial vehicle of claim 3, wherein the control circuitry is further configured to, after changing the priority of the each of the one or more of the plurality of regions, update the destination to one of the plurality of regions that has the highest priority among the plurality of regions.

5. The unmanned aerial vehicle of claim 3, wherein:
the one or more of the plurality of regions are first one or more of the plurality of regions; and
the control circuitry is further configured to, after changing the priority of the each of the first one or more of the plurality of regions, change the destination to a region having the highest priority among the first one or more of the plurality of regions and second one or more of the plurality of regions that have never been selected as the destination.

6. The unmanned aerial vehicle of claim 3, wherein the control circuitry is further configured to change the priority of the each of the one or more of the plurality of regions regardless of when the priority change instruction is received.

7. The unmanned aerial vehicle of claim 1, wherein the control circuitry is further configured to:
select a path for the unmanned aerial vehicle to fly to the first one of the plurality of regions; and
calculate the risk level score for delivering the package to the first one of the plurality of regions based on the selected path.

8. The unmanned aerial vehicle of claim 7, wherein the control circuitry is further configured to calculate the risk level score for delivering the package to the first one of the plurality of regions based on a plurality of evaluation items that affect the selected path.

9. The unmanned aerial vehicle of claim 8, wherein the control circuitry is further configured to determine, in response to at least one value of an evaluation item from among quantified values of the plurality of evaluation items exceeding a predetermined threshold value, that the first one of the plurality of regions is not suitable for delivering the package.

10. The unmanned aerial vehicle of claim 8, wherein the control circuitry is further configured to determine, in response to a value totaling each quantified value of the plurality of evaluation items exceeding a predetermined threshold value, that the first one of the plurality of regions is not suitable for delivering the package.

11. The unmanned aerial vehicle of claim 8, wherein the plurality of evaluation items include items relating to each other.

12. The unmanned aerial vehicle of claim 8, wherein at least one of the plurality of evaluation items is a value indicating an extent to which an obstacle in the selected path affects the selected path.

13. The unmanned aerial vehicle of claim 12, wherein the value is higher with the obstacle being detected than without the obstacle being detected.

14. The unmanned aerial vehicle of claim 12, wherein the value is higher after the obstacle remains being detected for a period of time than before the obstacle was detected.

15. The unmanned aerial vehicle of claim 12, further comprising at least one of:
an ultrasonic sensor configured to detect the obstacle;
a laser device including a transmitter and a receiver, the laser device being configured to detect the obstacle; or
a plurality of imaging devices configured to capture images having parallax for detecting the obstacle.

16. The unmanned aerial vehicle of claim 1, wherein the control circuitry is further configured to, after the unmanned aerial vehicle takes off and before the unmanned aerial vehicle reaches the first one of the plurality of regions, calculate the risk level score based on an evaluation results of at least one of:
an environment of the unmanned aerial vehicle that the unmanned aerial vehicle in currently located in; or
a state of the unmanned aerial vehicle.

17. The unmanned aerial vehicle of claim 16, wherein the control circuitry is further configured to, after the unmanned aerial vehicle takes off and before the unmanned aerial vehicle reaches the first one of the plurality of regions, evaluate the environment of the unmanned aerial vehicle that the unmanned aerial vehicle is currently located in based on a wind speed in the environment that the unmanned aerial vehicle is currently located in.

18. The unmanned aerial vehicle of claim 17, further comprising:
an anemometer configured to measure the wind speed.

19. The unmanned aerial vehicle of claim 17, further comprising:
an inertial measurement unit (IMU) configured to obtain an acceleration and an angular velocity of the unmanned aerial vehicle,
wherein the control circuitry is further configured to calculate the wind speed based on the acceleration and the angular velocity.

20. The unmanned aerial vehicle of claim 16, wherein the state of the unmanned aerial vehicle includes a state of a battery of the unmanned aerial vehicle.

* * * * *